(12) United States Patent
Luo et al.

(10) Patent No.: US 9,262,363 B2
(45) Date of Patent: Feb. 16, 2016

(54) PCI AND PCI EXPRESS VIRTUAL HOT PLUG SYSTEMS AND METHODS

(71) Applicants: Gang Luo, Ottawa (CA); Azam Syed, Ottawa (CA); Randy Hilderman, Nepean (CA)

(72) Inventors: Gang Luo, Ottawa (CA); Azam Syed, Ottawa (CA); Randy Hilderman, Nepean (CA)

(73) Assignee: Ciena Corporation, Hanover, MD (US)

( * ) Notice: Subject to any disclaimer, the term of this patent is extended or adjusted under 35 U.S.C. 154(b) by 568 days.

(21) Appl. No.: 13/690,018

(22) Filed: Nov. 30, 2012

(65) Prior Publication Data

US 2014/0156898 A1    Jun. 5, 2014

(51) Int. Cl.
*G06F 13/00*    (2006.01)
*G06F 13/40*    (2006.01)

(52) U.S. Cl.
CPC ................... *G06F 13/4081* (2013.01)

(58) Field of Classification Search
CPC .......................... G06F 9/45533; G06F 11/1484
USPC ....................... 710/300–306; 718/1
See application file for complete search history.

(56) References Cited

U.S. PATENT DOCUMENTS

| | | | |
|---|---|---|---|
| 7,836,238 B2 | 11/2010 | Freimuth et al. | |
| 2008/0040526 A1* | 2/2008 | Suzuki et al. | 710/302 |
| 2011/0029693 A1* | 2/2011 | Brinkmann et al. | 710/8 |
| 2011/0145815 A1 | 6/2011 | Zou et al. | |
| 2011/0185163 A1 | 7/2011 | Hidaka | |
| 2011/0296411 A1* | 12/2011 | Tang et al. | 718/1 |
| 2012/0131201 A1 | 5/2012 | Matthews et al. | |

OTHER PUBLICATIONS

The PCI Special Interest Group (SIG); "PCI Standard Hot-Plug Controller and Subsystem Specification"; Copyright (c) 2001 PCI Special Interest Group; Revision 1.0 Jun. 20, 2001.
Dan Froelich; "PCI/SIG—PCI Express (R) 2.0 Electrical Specification overview"; APAC PCIe Technical Seminar; Copyright (c) 2006, PCI-SG, All Rights Reserved.
Michael Opdenacker; "Linux PCI drivers" Free Electrons—Embedded Linux Developers; (c) Copyright 2004-2009, Created Commons BY—SA 3.0 license; Latest update: Jul. 13, 2010.
A. Piotrowski; "EuCARD ACC RFTech—PCIExpress Hot-Plug Mechanism in Linux-based ATCA Control Systems"; The research leading to these results has received funding from the FP7 Research Infrastructures project EuCARD, grant agreement No. 227579.

* cited by examiner

*Primary Examiner* — Tim T Vo
*Assistant Examiner* — Kim T. Huynh
(74) *Attorney, Agent, or Firm* — Clements Bernard PLLC; Christopher L. Bernard; Lawrence A. Baratta, Jr.

(57) ABSTRACT

Virtual hot plug systems and methods are described for Peripheral Component Interconnect (PCI), PCI Express (PCIe), and variants thereof. Specifically, the virtual hot plug systems and methods enable PCI related devices to support a hot plug configuration with such devices lacking hot plug controller hardware. The virtual hot plug systems and methods include intelligent polling logic for discovering the new PCI/PCIe devices with proper logic to access the hardware and avoid hanging or locking up the operating system.

20 Claims, 5 Drawing Sheets

FIG. 2 *(Prior Art)*

PCI AND PCI EXPRESS VIRTUAL HOT PLUG SYSTEMS AND METHODS

FIELD OF THE INVENTION

Generally, the field of art of the present disclosure pertains to computer and digital hardware interconnect systems and methods, and more particularly, to Peripheral Component Interconnect (PCI) and PCI Express (PCIe) virtual hot plug systems and methods.

BACKGROUND OF THE INVENTION

PCI and PCIe are computer expansion bus standards. PCI and PCIe are defined in various standards associated with the PCI-SIG (available online at www.pcisig.com/specifications/). As described herein, reference to PCI and/or PCIe means PCI, PCIe, and variants thereof. There are two reported methods of PCI device configurations supported in the existing operating systems (OSs) such as Linux and VxWorks: (1) PCI devices are plugged and powered before booting operating systems (referred to as a cold plug), and (2) PCI devices are plugged and powered after operating systems booting (referred to as a hot plug). For the cold plug, PCI devices are plugged in and powered before booting the operating systems. With this approach, before starting PCI enumeration during OS booting, the PCI devices must meet the following requirements: must be electrically connected to the system (i.e. plugged, and powered on), must have all required clocks, and must be out of reset. Furthermore, the exiting Linux PCI rescan/re-enumeration is only effective for PCI devices that have been enumerated during OS PCI subsystem's first PCI enumeration.

For the hot plug, PCI devices are plugged and powered after booting the operating systems. This hot plug approach was introduced to enable higher availability of the systems of removing and installing PCI add-in cards while the system is running For this hot plug approach, before starting PCI enumeration during OS booting, the PCI devices must meet the following requirements: must not be electrically connected to the system (i.e. not plugged, not powered on), must not have any required clocks, and must be in reset. When using this hot plug approach, PCI hot plug controller hardware is required to detect whether a new PCI device is plugged in and is ready to use. The hot plug controllers inform a hot plug controller module for handling the discovery and resource management of the newly-powered PCI devices. This approach is explained in detail in "PCI Express Hot-Plug Mechanism in Linux-based ADCA Control Systems," the contents of which are incorporated by reference herein, (available online at accnet.web.cern.ch/accnet/Literature/2010/RFTECH_Presentation_Piotrowski_Adam.pdf). The full PCI enumeration mentioned herein is the process of assigning resources to all the PCI controllers on a given PCI host bridge. This process includes the following: discovering the accessible PCI devices, assigning PCI bus numbers and PCI interrupts, allocating PCI Input/Output (I/O) resources, PCI memory resources, and PCI prefetchable memory resources, and setting miscellaneous PCI Direct Memory Access (DMA) values. The full PCI enumeration is performed only once during the boot process or during reception of a PCI hot plug event. The subsequent enumeration only handles the PCIe devices that have been discovered in the full enumeration.

Disadvantageously, circumstances can arise where one of the two aforementioned approaches (cold plug and hot plug) are unavailable. For example, PCI devices could be physically plugged into (connected to) a PCI Root Complex before booting, but they are not able to be accessed by the OS software. The reason is that these PCI devices need to have a clock configuration and be out of reset to be accessible. Without the clock configuration and reset handling in the bootloader, the current systems and methods cannot handle the cold plug. The clock configuration and reset handling in the bootloader cannot be done since it has serious architectural drawbacks such as writing the clock drivers and complex clock initializing within processor boot. Further, these PCI devices may not have any hot plug controller hardware, which is required if these devices are plugged and powered after the operating system has been booted. Thus, there is a need within PCI, PCIe, and variants thereof for another method of PCI device configuration to overcome the aforementioned constraints.

BRIEF SUMMARY OF THE INVENTION

In various exemplary embodiments, virtual hot plug systems and methods are described for PCI, PCIe, and variants thereof. Specifically, the virtual hot plug systems and methods enable PCI related devices to support a hot plug configuration with such devices lacking hot plug controller hardware. The virtual hot plug systems and methods include intelligent polling logic for discovering the new PCI/PCIe devices with proper logic to access the hardware and avoid hanging or locking up the operating system. The virtual hot plug systems and methods can be implemented into a loadable Kernel module, such as in Linux, without being statically linked to operating system kernel. The virtual hot plug systems and methods do not need the hot plug hardware support resulting in reduced hardware costs. Further, the virtual hot plug systems and methods are designed to re-use certain Linux applicable OS PCI hot plug functions when being implemented in Linux.

In an exemplary embodiment, a virtual hot plug system includes a Root Complex configured to be communicatively coupled to a Peripheral Component Interconnect (PCI) or PCI express (PCIe) device including virtual hot plug enabling hardware thereon without corresponding hot plug controller hardware on the PCI/PCIe device; a virtual hot plug controller communicatively coupled to the Root Complex, wherein the virtual hot plug controller is configured to: intelligently poll the Root Complex to discover the PCI/PCIe device while avoiding hanging or locking up an operating system; and perform a virtual hot plug of the PCI/PCIe device configuring a PCI/PCIe subsystem in the operating system.

In another exemplary embodiment, a virtual hot plug method includes physically connecting a Peripheral Component Interconnect (PCI) or PCI express (PCIe) device to a system, wherein the PCI/PCIe device includes virtual hot plug enabling hardware thereon without corresponding hot plug controller hardware on the PCI/PCIe device; intelligently polling a Root Complex to discover the PCI/PCIe device while avoiding hanging or locking up an operating system; and performing a virtual hot plug of the PCI/PCIe device with a virtual hot plug controller configuring a PCI/PCIe subsystem in the operating system.

In yet another exemplary embodiment, a system includes a Peripheral Component Interconnect (PCI) or PCI express (PCIe) device including virtual hot plug enabling hardware thereon without corresponding hot plug controller hardware on the PCI/PCIe device; a Root Complex configured to be communicatively coupled to the PCI/PCIe device; and a processor executing: an operating system including a PCI/PCIe subsystem including initialization data and a hot plug rescan utility; a virtual hot plug controller; a virtual hot plug enabling hardware monitor; and a Root Complex monitor; and an initialization data handler; wherein the virtual hot plug enabling hardware monitor is configured to detect a presence and electrical readiness of the PCI/PCIe device; wherein the Root Complex monitor is configured to detect readiness of the Root Complex; and wherein the virtual hot plug controller is configured to modify the initialization data via the initialization data handler responsive to readiness of the PCI/PCIe device and the Root Complex and to direct the PCI/PCIe subsystem to execute the hot plug rescan utility.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

Again, in various exemplary embodiments, virtual hot plug systems and methods are described for PCI, PCIe, and variants thereof. Specifically, the virtual hot plug systems and methods enable PCI related devices to support a hot plug configuration with such devices lacking hot plug controller hardware. The virtual hot plug systems and methods include intelligent polling logic for discovering the new PCI/PCIe devices with proper logic to access the hardware and avoid hanging or locking up the operating system. The virtual hot plug systems and methods can be implemented into a loadable Kernel module, such as in Linux, without using a PCI hookup bind-in function for being statically linked to operating system kernel. The virtual hot plug systems and methods do not need the hot plug hardware support resulting in reduced hardware costs. Further, the virtual hot plug systems and methods are designed to re-use certain Linux applicable OS PCI hot plug functions when being implemented in Linux.

Figure 1:
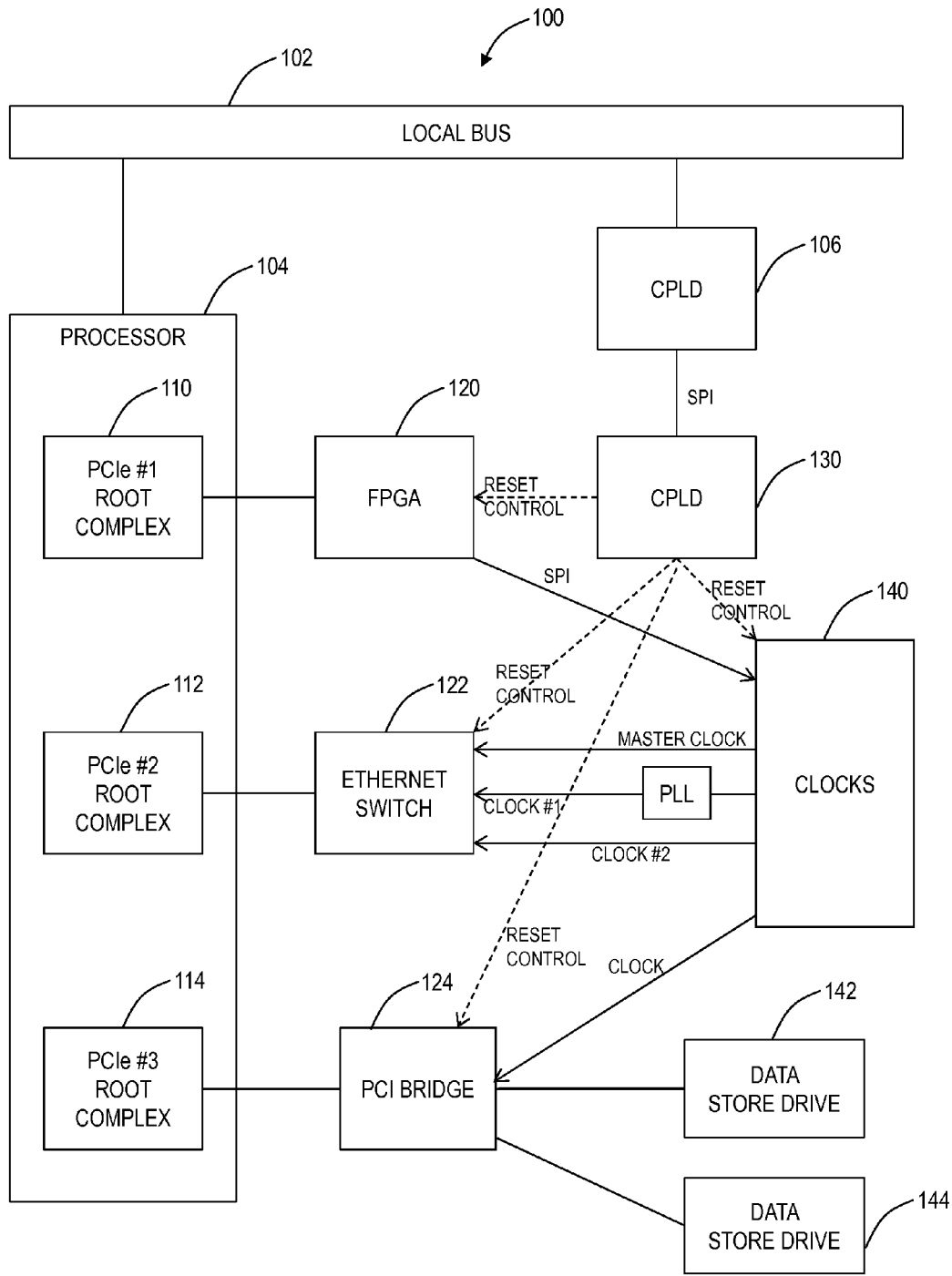
FIG. 1 is a block diagram illustrates a hardware architecture showing PCIe subsystems and related hardware for the virtual hot plug systems and methods.

Referring to FIG. 1, in an exemplary embodiment, a block diagram illustrates a hardware architecture 100 showing PCIe subsystems and related hardware for the virtual hot plug systems and methods. The hardware architecture 100 includes a local bus 102 communicatively coupled to a processor 104 and a complex programmable logic device (CPLD) 106. The local bus 102 can be, for example but not limited to, one or more buses or other wired or wireless connections, as is known in the art. The local bus 102 can have additional elements, which are omitted for simplicity, such as controllers, buffers (caches), drivers, repeaters, and receivers, among many others, to enable communications. Further, the local bus 102 can include address, control, and/or data connections to enable appropriate communications among the aforementioned components.

The processor 104 can include various PCIe root complex devices 110, 112, 114. In the hardware architecture 100, the PCIe root complex devices 110, 112, 114 connect the processor 104 and memory subsystems (not shown) to a PCI Express switch fabric composed of one or more switch devices. Similar to a host bridge in a PCI system, the root complex generates transaction requests on behalf of the processor 104, which is interconnected through the local bus 102. Root complex functionality may be implemented as a discrete device, or may be integrated with the processor 104. The PCIe root complex devices 110, 112, 114 can contain more than one PCIe port and multiple switch devices can be connected to ports on the root complex or cascaded.

In the exemplary embodiment of FIG. 1, the PCIe root complex devices 110, 112, 114 are communicatively coupled to a Field Programmable Gate Array (FPGA) 120, a first Ethernet switch 122, and a PCI bridge 124 for illustration purposes. PCI bridge 124 is a PCIe endpoint for PCIe Root Complex 114, and it is communicatively coupled to data storage drives 142, 144. Additionally, the hardware architecture 100 includes a second CPLD 130 and a clock circuit 140. The CPLD 130 is communicatively coupled to the CPLD 106 via a Serial Peripheral Interface (SPI) bus. The FPGA 120 is communicatively coupled to the clock circuit 140 via an SPI bus. The CPLD 130 is configured to provide reset control to each of the FPGA 120, the Ethernet switch 122, and the clock circuit 140. The clock circuit 140 can provide clocks to the Ethernet switch 122, such as a master clock and clocks #1, #2. Also, the clock #1 can include a phase-lock loop (PLL). As described herein, the hardware architecture 100 is presented for illustration purposes and those of ordinary skill in the art will recognize the following virtual hot plug systems and methods contemplate use with any PCI, PCIe, etc. system.

In the hardware architecture 100, the PCIe devices (i.e., the FPGA 120 and the Ethernet switch 122, and PCI Bridge 124) are physically connected to the processor's 104 PCIe Root Complex 110, 112, 114. However, these devices 120, 122, 124 have the following characteristics: they are in reset, they do not have any required clocks, and they do not have the hot plug controller hardware module specified in and required by the PCI/PCIe hot plug specifications. The PCIe devices 120, 122, 124 are usable only after configuration of several other depending devices according the following description. The FPGA 120 needs the following performed, namely configuring the CPLD 106 for accessing the CPLD 130 and configuring the CPLD 130 for taking the FPGA 120 out of reset. The Ethernet switch 122 needs the following performed, namely configuring the CPLD 106 for accessing the CPLD 130, configuring the CPLD 130 for taking the FPGA 120 out of reset, configuring the CPLD 130 for taking the Ethernet switch 122 out of reset, download and configuring the FPGA 120, and configuring the FPGA 120 for setting the clock circuit 140.

From the above observation, the PCIe devices 120, 122, 124 are not usable or accessible in the hardware architecture 100 prior to booting, as they are only usable after configuring the depending device. From enabling the PCIe devices 120, 122, 124 electrically, the step of configuring the depending devices is similar to the hot plug of PCIe device during running the systems. Therefore, the virtual hot plug systems and methods provide configuring the depending devices for enabling PCI/PCIe devices electronically as a "virtual PCI/PCIe hot plug" which can also be referred to herein as a "virtual PCI/PCIe hot plug architecture." The key characteristics of the virtual PCI/PCIe hot plug architecture are as follows: PCIe devices are physically connected to PCIe Root Complex, there are virtual hot plug-enabling devices that have to be properly configured before PCIe devices are electrically usable, and the PCIe devices are not electrically usable before doing the so-called virtual hot plug (i.e., configuring all depending devices for letting PCIe devices electrically usable).

Figure 2:
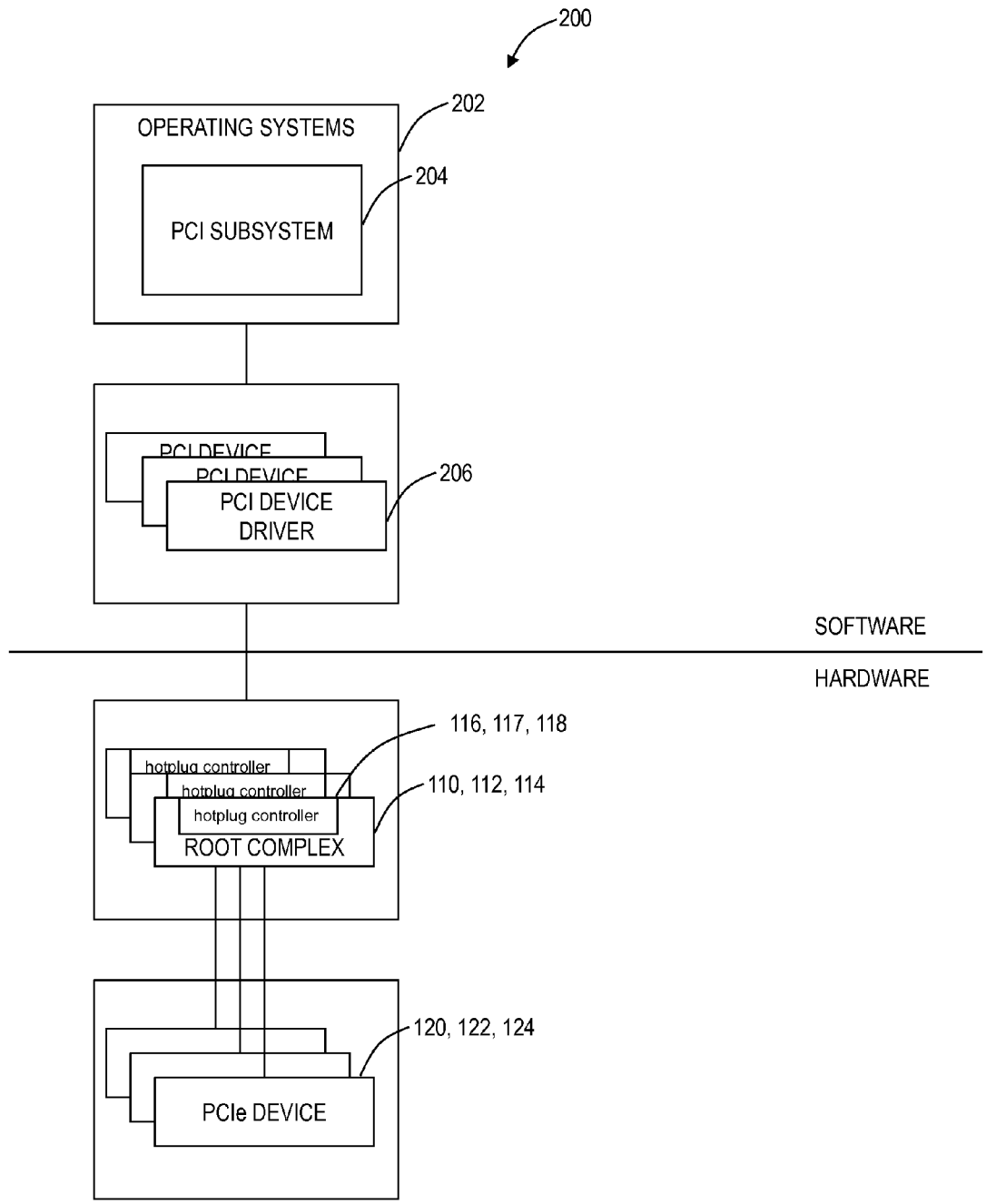
FIG. 2 is a block diagram of an existing PCI/PCIe hot plug architecture.

Referring to FIG. 2, in an exemplary embodiment, a block diagram illustrates an existing PCI/PCIe hot plug architecture 200. The PCI/PCIe hot plug architecture 200 includes software components including an OS 202, a PCI subsystem 204 within the OS 202, and associated PCI device drivers 206. The PCI/PCIe hot plug architecture 200 includes hardware components including the Root Complex 110, 112, 114, PCI hot plug controller 116, 117, 118, and the PCIe devices 120, 122, 124. First, comparing the hardware architecture 100 to the existing PCI/PCIe hot plug architecture 200, it is clear that the hot plug approach is not available for the virtual PCI/PCIe virtual hot plug architecture due to the lack of the PCI hot plug controller 116, 117, 118, for the systems such as the devices 110, 112, 114. It was considered to use the cold plug approach for devices 120, 122, 124, assuming that the use existing PCI/PCIe software support from OSs such as Linux. In this case, it is required that all PCI/PCIe devices 120, 122, 124 are "virtually hot plugged" before OS PCI subsystem's 204 first PCI enumeration.

As mentioned earlier, the exiting Linux PCI/PCIe rescan/re-enumeration is only effective for PCI/PCIe devices that have been enumerated during OS PCI subsystem's 204 first PCI enumeration. In order to use the cold plug support from the OS 202 such as Linux for the devices 120, 122, 124, all depending devices have to be configured before the OS PCI subsystem's 204 first PCI enumeration. Without major changes to the OS 202, this kind of device configuration has to be performed prior to launching the OS 202, and therefore needs to be located in the bootloader. Moving the device configuration to the bootloader requires the following. First, this requires bringing significant levels of application level and specific device drivers' source code into the bootloader such as u-boot. The requirement on u-boot is that it is expected to be small in size, and it should avoid the addition of application level and device-specific code to it. Second, this requires having device-specific configuration logic in the bootloader, which is expected to be simple and common. Third, this requires having duplicate source code and features in both applications and bootloader, which creates the code redundancy, and poor maintainability. Of course, the aforementioned constraints pose a significant problem to the hardware architecture 100 using the existing PCI/PCIe hot plug architecture 200.

Figure 3:
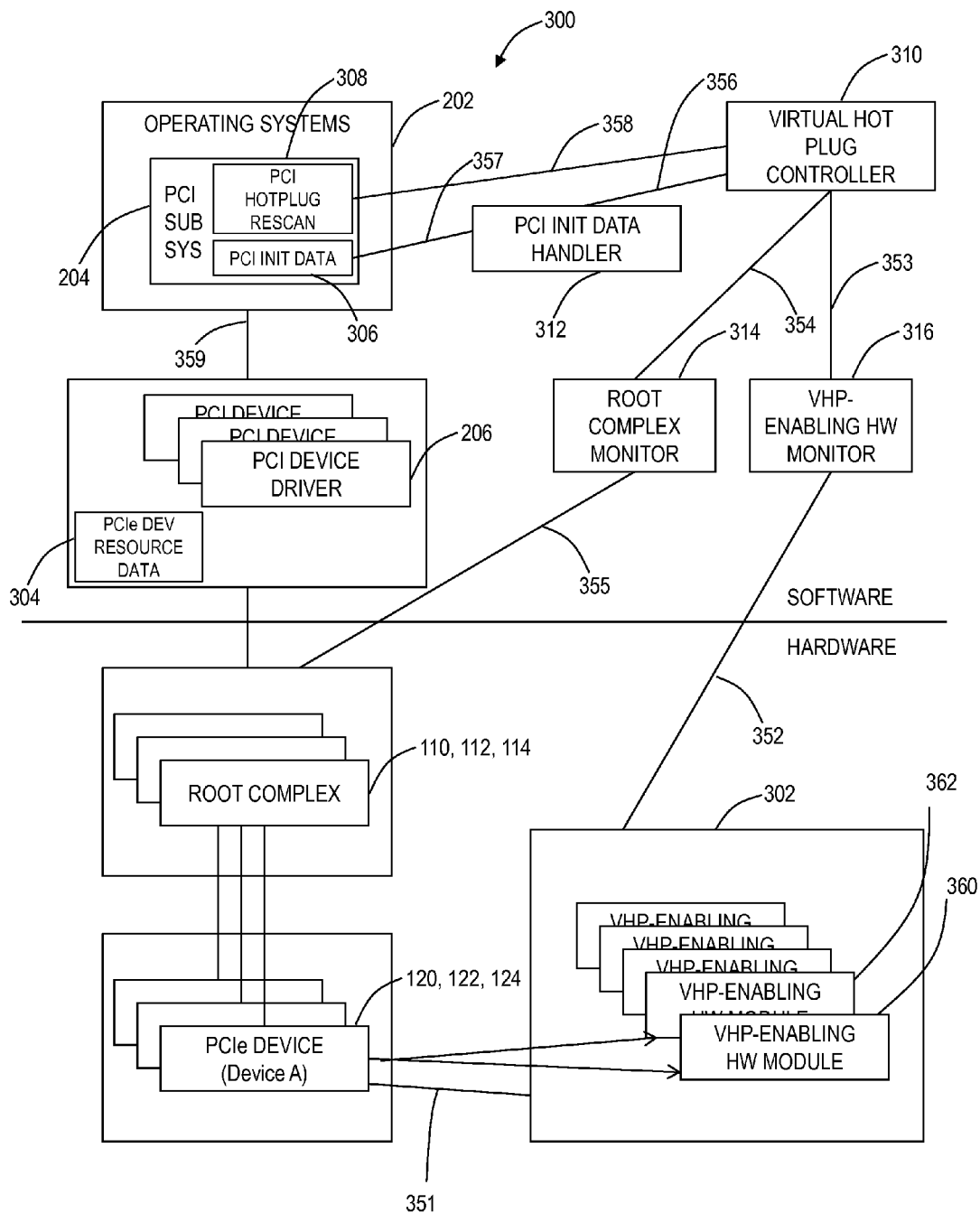
FIG. 3 is a block diagram of a PCI/PCIe virtual hot plug architecture.

Referring to FIG. 3, in an exemplary embodiment, a block diagram illustrates a PCI/PCIe virtual hot plug architecture 300. Similar to the existing PCI/PCIe hot plug architecture 200, the virtual hot plug architecture 300 includes software components including the OS 202, the PCI subsystem 204 within the OS 202, and the associated PCI device drivers 206. The virtual hot plug architecture 300 includes hardware components including the Root Complex 110, 112, 114 without PCI hot plug controller hardware, and the PCIe devices 120, 122, 124. The virtual hot plug architecture 300 is designed to handle and introduce the PCIe virtual hot plug in the hardware architecture 100. The virtual hot plug architecture 300 includes hardware including a group of VHP-enabling hardware 302, which includes modules 360, 362, 364, and so on. The virtual hot plug architecture 300 includes software including PCIe device resource data 304, PCI initialization data 306 and PCI hotscan rescan software 308 in the PCI subsystem 204, a virtual hot plug controller 310, virtual hot plug initialization data handler software 312 between the virtual hot plug controller 310 and the PCI subsystem 204, Root Complex monitor software 314 between the virtual hot plug controller 310 and the Root Complex 110, 112, 114, and VHP-enabling hardware monitor software 316 between the virtual hot plug controller 310 and the VHP-enabling hardware 302.

The VHP-enabling hardware 302 includes circuitry, logic, firmware, etc. on which the devices 120, 122, 124 depend for being electrically usable. The VHP-enabling hardware monitor software 316 is responsible for checking whether there is a new PCIe device electrically usable. Specifically, the VHP-enabling hardware monitor software 316 has the knowledge on the VHP-enabling hardware 302 for each PCIe device. When VHP-enabling hardware monitor software 316 finds a new PCIe device electrically usable, it will inform the virtual hot plug controller 310 for handling the newly discovered PCIe device. The Root Complex monitor software 314 is responsible for checking whether a given PCIe Root Complex 110, 112, 114 hardware is usable.

Currently, the existing Linux PCI/PCIe rescan/re-enumeration is only effective for PCI/PCIe devices that have been enumerated during the OS 202 PCI subsystem's 204 first PCI enumeration, if there is no PCI hot plug controller hardware in the system. In order to reuse the existing utilities, the virtual hot plug initialization data handler software 312 has been re-processed. The virtual hot plug initialization data handler software 312 is responsible for re-processing the PCI init data 306 for using certain of Linux PCI/PCIe utility for the virtual hot plug architecture 300. The virtual hot plug controller 310 is responsible to coordinate multiple components in the virtual hot plug architecture 300 for handling newly usable PCI/PCIe devices. The virtual hot plug architecture 300 is illustrated as an exemplary embodiment with other components omitted for illustration purposes. Those of ordinary skill in the art will recognize the virtual hot plug systems and methods contemplate use with any PCI/PCIe architecture with the additional software and hardware components described herein. Further, the virtual hot plug architecture 300 is simplified for ease of discussion in that each PCI root complex 110, 112, 114 is connected to a PCI End point device 120, 122, 124 that is not a PCI bridge. For the cases that PCI End point devices are also PCI bridges, the above techniques can be extended to a layered approach for checking and handling.

The virtual hot plug architecture 300 is now described with respect to an exemplary operation (steps 351-359). Consider a given PCIe device A 120 that has two depending enabling HW modules 360, and 362 as shown in the previous diagram. For example, the depending enabling HW modules 360, and 362 can be an FPGA, a CPLD, a clock module and/or other devices. Assume that the operating system 202 is fully booted. To describe the virtual hot plug architecture 300, the events and/or actions occur in the following sequence. The two VHP enabling modules 360, and 362 within 302 for the PCIe device A 120 are now configured (step 351). The VHP-enabling hardware monitor software 316 detects the completion of all depending VHP-enabling hardware 360, and 362 within 302 for the PCIe device A 120 (step 352). The virtual hot plug controller 310 learns of the electrically readiness of the PCIe device A 120, i.e. a so-called VHP event (step 353).

The virtual hot plug controller 310 instructs the Root Complex monitor software 314 to check the hardware readiness of the Root Complex 110, 112, 114 for the PCIe device A (step 354). The Root Complex monitor software 314 does an actual check of hardware readiness of the Root Complex 110, 112, 114 for the PCIe device A (step 355). Upon the detection of the readiness of the relevant Root Complex 110, 112, 114, the virtual hot plug controller 310 modifies the PCI init data 306 through the virtual hot plug initialization data handler software 312, enabling the PCI hot plug rescan 308 for the PCIe device A (step 356). The virtual hot plug initialization data handler software 312 actually modifies the PCI init data 306 for the virtual hot plug controller 310 (step 357). The virtual hot plug controller 310 now uses the PCI hot plug specific rescan 308 utility to discover the PCIe device A 120, and register the PCIe device A 120 into the OS PCIs subsystem 204 (step 358). At this point, the PCIe device A 120 is now visible from using OS's PCIe enumeration commands. For Linux, it is possible to use "lspci" to display the PCIe device A 120. If the device A's PCIe driver has be already started at this point, the driver will be triggered indirectly by the virtual hot plug controller's 310 use of the PCI hot plug specific rescan 308 (step 359). At this time the PCIe resources, such as outbound and inbound windows, interrupts setting and so on, will be configured by the PCI driver through the PCI subsystem 204.

Figure 4:
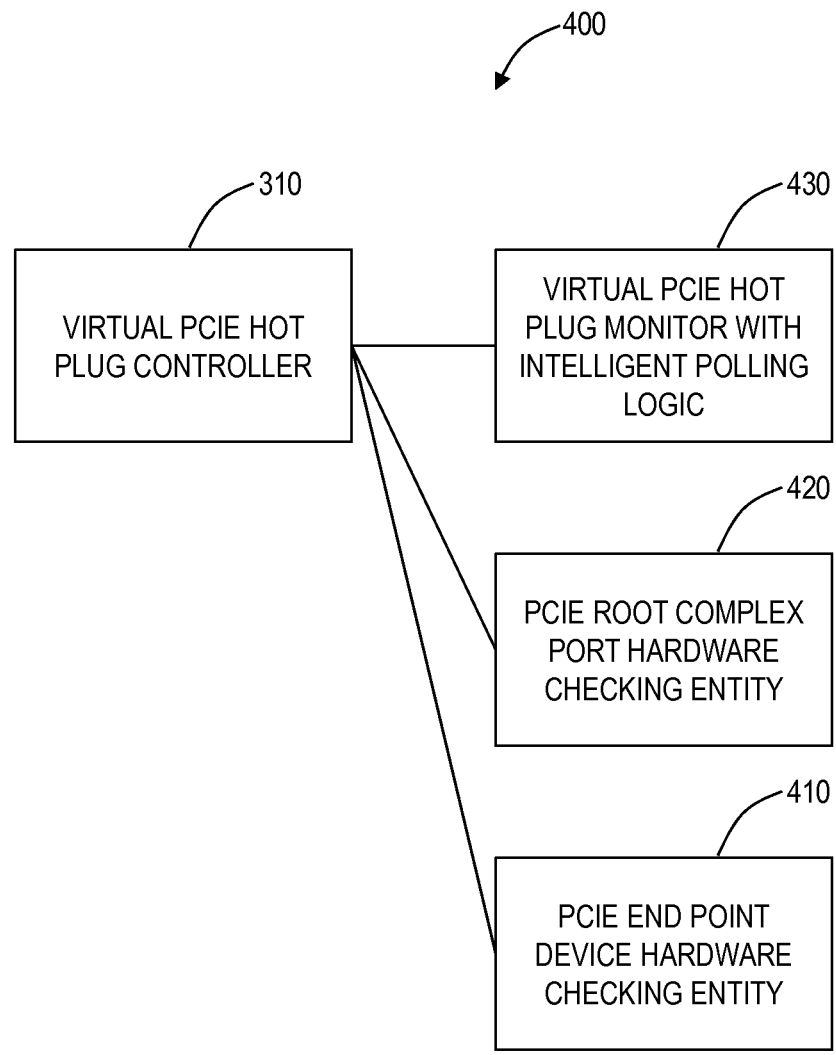
FIG. 4 is a block diagram of functionality of a virtual hot plug environment.

Referring to FIG. 4, in an exemplary embodiment, a block diagram illustrates functionality of a virtual hot plug environment 400. The virtual hot plug environment 400. Includes the following structure and components, namely the virtual hot plug controller 310, a PCIe End Point device hardware checking entity 410, a PCIe Root Complex Port hardware checking entity 420, and Virtual PCIe hot plug monitor with intelligent polling logic 430. These various devices and components (310, 410, 420, 430) can be implemented in software, firmware, hardware, and combinations thereof. The PCIe End Point device hardware checking entity 410 contains an End Point Device-specific status checking utility that will be used by the virtual hot plug monitor 316.

The PCIe Root Complex Port hardware checking entity 420 contains a PCIe Root Complex (RC) specific status checking utility that will be used by the root complex monitor 314. The Virtual PCIe hot plug monitor with intelligent polling logic 430 uses the above modules and coordinates them to discover the PCIe End Point devices. The polling functionality has intelligent checking logic to prevent device hanging, software lockups or device resets. Inappropriate methods of checking these devices can cause such adverse effects. The virtual hot plug controller 310 is informed by the virtual hot plug monitor 316 to set up the newly discovered PCI/PCIe endpoint devices. It configures both the processor Root Complexes and PCIe end point devices.

The virtual hot plug systems and methods separate the device-specific resource management from generic virtual PCIe hot plug control logic. For example, in an exemplary implementation, the PCIe resource assignment information is stored in a *.dts file, which is a standard way for Linux to store the information for drivers. The PCIe resource assignment is not hard-coded into the virtual PCIe hot plug software, which means the virtual PCIe hot plug software is generic across differing device hardware. Advantageously, the virtual hot plug systems and methods include Intelligent polling logic for discovering the new PCIe devices with proper logic to access the hardware and avoid hanging or locking up the OS. The virtual hot plug systems and methods can be implemented into the loadable Kernel module in Linux without the need of being statically linked to OS kernel. The virtual hot plug systems and methods do not need the hot plug hardware support resulting in reduced hardware costs. The virtual hot plug systems and methods is designed to re-use the certain Linux applicable OS PCI hot plug functions when being implemented in Linux.

Figure 5:
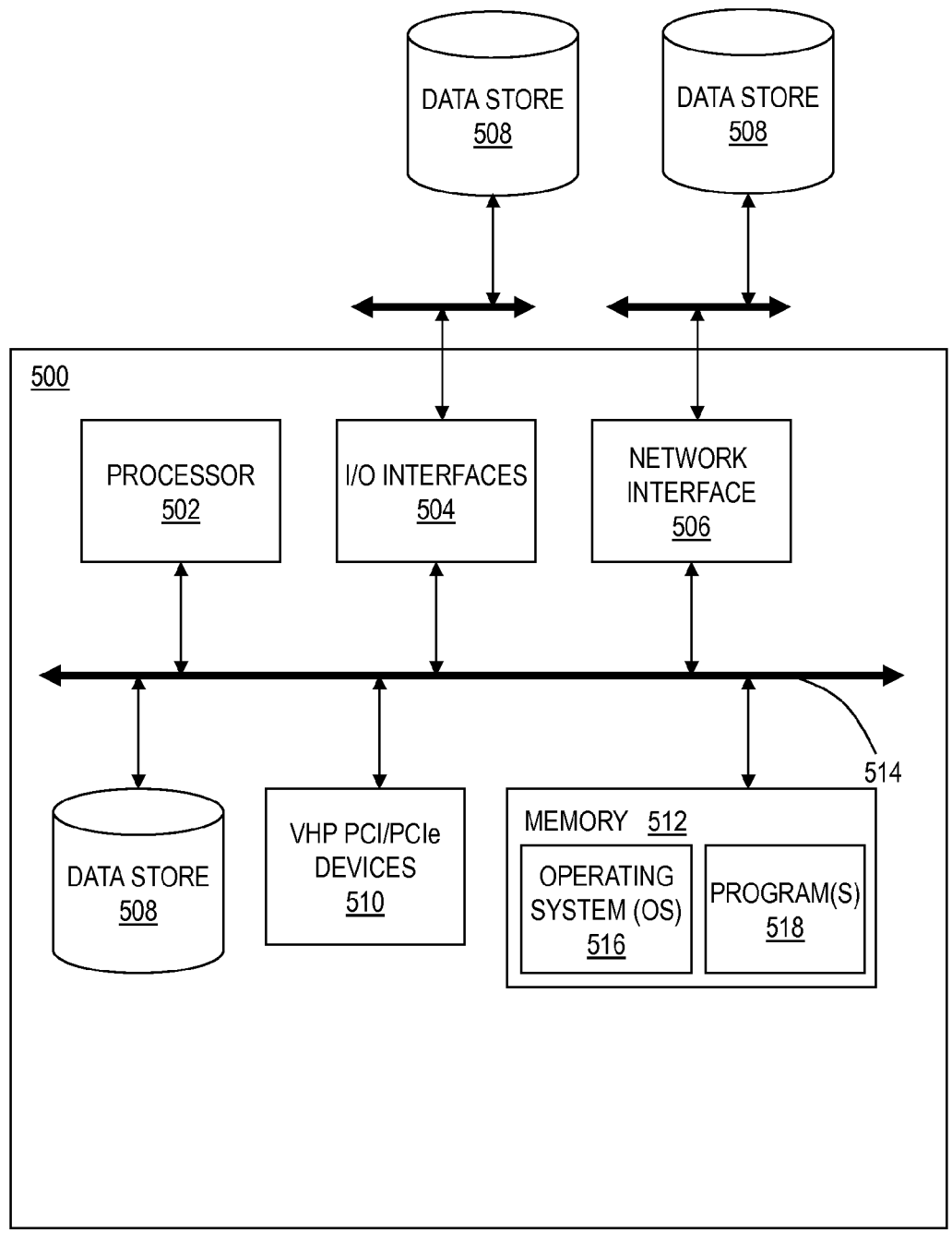
FIG. 5 is a block diagram of a digital device which may be used with the virtual hot plug systems and methods described herein.

Referring to FIG. 5, in an exemplary embodiment, a block diagram illustrates a digital device 500 which may be used with the virtual hot plug systems and methods described herein. The digital device 500 may be a digital computer or other type of a digital processing device that, in terms of hardware architecture, generally includes a processor 502, input/output (I/O) interfaces 504, a network interface 506, a data store 508, VHP PCI/PCIe devices 510, and memory 512. It should be appreciated by those of ordinary skill in the art that FIG. 5 depicts the digital device 500 in an oversimplified manner, and a practical embodiment may include additional components and suitably configured processing logic to support known or conventional operating features that are not described in detail herein. The components (502, 504, 506, 508, 510, 512) are communicatively coupled via a local interface 514. The local interface 514 may be, for example but not limited to, one or more buses or other wired or wireless connections, as is known in the art. The local interface 514 may have additional elements, which are omitted for simplicity, such as controllers, buffers (caches), drivers, repeaters, and receivers, among many others, to enable communications. Further, the local interface 514 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the digital device 500, a semiconductor-based microprocessor (in the form of a microchip or chip set), or generally any device for executing software instructions. When the digital device 500 is in operation, the processor 502 is configured to execute software stored within the memory 512, to communicate data to and from the memory 512, and to generally control operations of the digital device 500 pursuant to the software instructions. The I/O interfaces 504 may be used to receive user input from and/or for providing system output to one or more devices or components. User input may be provided via, for example, a keyboard, touch pad, and/or a mouse. System output may be provided via a display device and a printer (not shown). I/O interfaces 504 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface. Note, the VHP PCI/PCIe devices 510 can, in an exemplary embodiment, be coupled to the local interface 512, and, in another exemplary embodiment, be coupled to the local interface 512 via the I/O interfaces 504.

The network interface 506 may be used to enable the server 300 to communicate on a network. The network interface 506 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the digital device 500 such as, for example, an internal hard drive connected to the local interface 512 in the digital device 500. Additionally in another embodiment, the data store 508 may be located external to the digital device 500 such as, for example, an external hard drive connected to the I/O interfaces 504 (e.g., SCSI or USB connection). In a further embodiment, the data store 508 may be connected to the digital device 500 through a network, such as, for example, a network attached file server.

The memory 512 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 512 may incorporate electronic, magnetic, optical, and/or other types of storage media. Note that the memory 512 may have a distributed architecture, where various components are situated remotely from one another, but can be accessed by the processor 502. The software in memory 512 may include one or more software programs, each of which includes an ordered listing of executable instructions for implementing logical functions. The software in the memory 512 includes a suitable operating system (O/S) 516 and one or more programs 518. The operating system 516 essentially controls the execution of other computer programs, such as the one or more programs 518, and provides scheduling, input-output control, file and data management, memory management, and communication control and related services. The operating system 516 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), VxWorks (available from Wind River Systems of Alameda, Calif.), or the like. The one or more programs 518 may be configured to implement the various processes, algorithms, methods, techniques, etc. described herein.

The VHP PCI/PCIe devices 510 can include devices which do not include hot plug controllers, but which can utilize the virtual hot plug systems and methods via the virtual hot plug architecture 300 and/or the virtual hot plug environment 400 being implemented on the digital device 500.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A virtual hot plug system, comprising:
   a Root Complex configured to be communicatively coupled to a Peripheral Component Interconnect (PCI) or PCI express (PCIe) device comprising virtual hot plug enabling hardware thereon without corresponding hot plug controller hardware on the PCI/PCIe device; and
   a virtual hot plug controller communicatively coupled to the Root Complex, wherein the virtual hot plug controller is configured to:
   intelligently poll the Root Complex to discover the PCI/PCIe device while avoiding hanging or locking up an operating system; and
   perform a virtual hot plug of the PCI/PCIe device configuring a PCI/PCIe subsystem in the operating system and configuring devices in the PCI/PCIe device while the PCI/PCIe device is coupled to the Root Complex and before the PCI/PCIe device is electrically usable.

2. The virtual hot plug system of claim 1, further comprising:
   a virtual hot plug enabling hardware monitor detecting a configuration of the virtual hot plug enabling hardware and communicating to the virtual hot plug controller.

3. The virtual hot plug system of claim 2, wherein the virtual hot plug enabling hardware monitor is configured to notify the virtual hot plug controller of electrical readiness of the PCI/PCIe device.

4. The virtual hot plug system of claim 1, further comprising:
   a Root Complex monitor communicatively coupled to the virtual hot plug controller and the Root Complex, wherein the Root Complex monitor is configured to check hardware readiness of the Root Complex for the PCI/PCIe device responsive to the virtual hot plug controller.

5. The virtual hot plug system of claim 1, further comprising:
   an initialization data handler communicatively coupled to the virtual hot plug controller and the operating system, wherein, upon detection of readiness of the Root Complex, the virtual hot plug controller modifies initialization data in the PCI/PCIe subsystem via the initialization data handler.

6. The virtual hot plug system of claim 1, further comprising:
   a hot plug rescan utility in the PCI/PCIe subsystem communicatively coupled to the virtual hot plug controller, wherein the virtual hot plug controller to discover the PCI/PCIe device subsequent to detection of readiness of the Root Complex and modification of initialization data in the PCI/PCIe subsystem.

7. The virtual hot plug system of claim 1, further comprising:

a virtual hot plug enabling hardware monitor detecting a configuration of the virtual hot plug enabling hardware and communicating to the virtual hot plug controller;

a Root Complex monitor communicatively coupled to the virtual hot plug controller and the Root Complex, wherein the Root Complex monitor is configured to check hardware readiness of the Root Complex for the PCI/PCIe device responsive to the virtual hot plug controller;

an initialization data handler communicatively coupled to the virtual hot plug controller and the operating system, wherein, upon the detection of readiness of the Root Complex, the virtual hot plug controller modifies initialization data in the PCI/PCIe subsystem via the initialization data handler; and a hot plug rescan utility in the PCI/PCIe subsystem communicatively coupled to the virtual hot plug controller, wherein the virtual hot plug controller to discover the PCI/PCIe device subsequent to the detection of readiness of the Root Complex and the modification of initialization data in the PCI/PCIe subsystem.

8. The virtual hot plug system of claim 7, wherein the virtual hot plug controller, the virtual hot plug enabling hardware monitor, the Root Complex monitor, and the initialization data handler are implemented in a loadable Kernel module.

9. The virtual hot plug system of claim 7, wherein the virtual hot plug controller, the virtual hot plug enabling hardware monitor, the Root Complex monitor, and the initialization data handler are implemented in a loadable Kernel module in Linux reusing at least one applicable hot plug function included in Linux.

10. The virtual hot plug system of claim 7, wherein the PCI/PCIe device, upon being connected in the virtual hot plug system, without a clock configuration and reset handling thereby being unable to use hot plug or cold plug.

11. A virtual hot plug method, comprising:
physically connecting a Peripheral Component Interconnect (PCI) or PCI express (PCIe) device to a system, wherein the PCI/PCIe device comprises virtual hot plug enabling hardware thereon without corresponding hot plug controller hardware on the PCI/PCIe device;
intelligently polling a Root Complex to discover the PCI/PCIe device while avoiding hanging or locking up an operating system; and
performing a virtual hot plug of the PCI/PCIe device with a virtual hot plug controller configuring a PCI/PCIe subsystem in the operating system and configuring devices in the PCI/PCIe device while the PCI/PCIe device is coupled to the Root Complex and before the PCI/PCIe device is electrically usable.

12. The virtual hot plug method of claim 11, further comprising:
detecting a configuration of the virtual hot plug enabling hardware and communicating to the virtual hot plug controller, wherein the configuration comprises electrical readiness of the PCI/PCIe device.

13. The virtual hot plug method of claim 11, further comprising:
checking hardware readiness of the Root Complex for the PCI/PCIe device responsive to the virtual hot plug controller.

14. The virtual hot plug method of claim 11, further comprising:
upon detection of readiness of the Root Complex, modifying initialization data in the PCI/PCIe subsystem via a initialization data handler.

15. The virtual hot plug method of claim 11, further comprising:
discovering the PCI/PCIe device subsequent to detection of readiness of the Root Complex and modification of initialization data in the PCI/PCIe subsystem.

16. The virtual hot plug method of claim 11, further comprising:
detecting a configuration of the virtual hot plug enabling hardware and communicating to the virtual hot plug controller, wherein the configuration comprises electrical readiness of the PCI/PCIe device;
checking hardware readiness of the Root Complex for the PCI/PCIe device responsive to the virtual hot plug controller;
upon the detection of readiness of the Root Complex, modifying initialization data in the PCI/PCIe subsystem via a initialization data handler; and
discovering the PCI/PCIe device subsequent to the detection of readiness of the Root Complex and the modification of initialization data in the PCI/PCIe subsystem.

17. The virtual hot plug method of claim 16, wherein the virtual hot plug controller, the virtual hot plug enabling hardware monitor, the Root Complex monitor, and the initialization data handler are implemented in a loadable Kernel module.

18. The virtual hot plug method of claim 16, wherein the virtual hot plug controller, the virtual hot plug enabling hardware monitor, the Root Complex monitor, and the initialization data handler are implemented in a loadable Kernel module in Linux reusing at least one applicable hot plug function included in Linux.

19. The virtual hot plug method of claim 16, wherein the PCI/PCIe device, upon being connected in the virtual hot plug system, without a clock configuration and reset handling thereby being unable to use hot plug or cold plug.

20. A system, comprising:
a Peripheral Component Interconnect (PCI) or PCI express (PCIe) device comprising virtual hot plug enabling hardware thereon without corresponding hot plug controller hardware on the PCI/PCIe device;
a Root Complex configured to be communicatively coupled to the PCI/PCIe device; and
a processor executing:
an operating system comprising a PCI/PCIe subsystem comprising initialization data and a hot plug rescan utility;
a virtual hot plug controller;
a virtual hot plug enabling hardware monitor;
a Root Complex monitor; and
an initialization data handler;
wherein the virtual hot plug enabling hardware monitor is configured to detect a presence and electrical readiness of the PCI/PCIe device;
wherein the Root Complex monitor is configured to detect readiness of the Root Complex;
wherein the virtual hot plug controller is configured to modify the initialization data via the initialization data handler responsive to readiness of the PCI/PCIe device and the Root Complex and to direct the PCI/PCIe subsystem to execute the hot plug rescan utility; and
wherein the virtual hot plug controller is configured to configure devices in the PCI/PCIe device while the PCI/PCIe device is coupled to the Root Complex and before the PCI/PCIe device is electrically usable.

* * * * *